Nov. 26, 1935.   J. H. BUTRIDGE   2,022,074
RAILWAY SIGNALING APPARATUS
Original Filed June 15, 1934
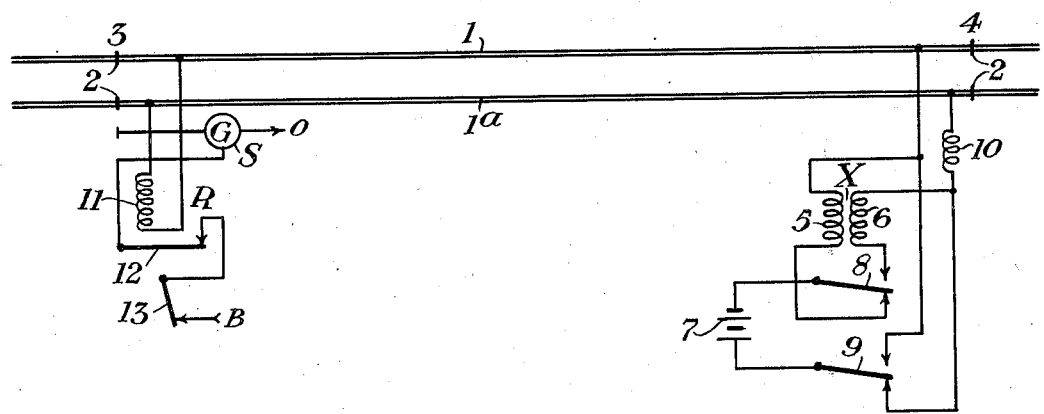
INVENTOR
James H. Butridge
BY
HIS ATTORNEY Patented Nov. 26, 1935

2,022,074

UNITED STATES PATENT OFFICE 2,022,074

RAILWAY SIGNALING APPARATUS

James H. Butridge, Chicago, Ill., assignor to The Union Switch & Signal Company, Swissvale, Pa., a corporation of Pennsylvania Application June 15, 1934, Serial No. 730,771
Renewed October 27, 1934

12 Claims. (Cl. 246—41)

My invention relates to railway signaling track circuits, and has for an object the provision of novel and improved means for insuring the response of a track relay when a car or train enters the associated section.

I will describe one form of track circuit embodying my invention, and will then point out the novel features thereof in claims.

The accompanying drawing is a diagrammatic view showing one form of track circuit embodying my invention.

Referring to the drawing, the reference characters 1 and 1ª designate the track rails of a stretch of railway track, which rails are divided by insulated joints 2 to form a track section 3—4.

Located at one end of this section is a source of track circuit current which, as here shown, is a battery 7. The supply of current from this battery to the track rails is controlled by a relay X, having two operating windings 5 and 6, and two neutral contacts 8 and 9. This relay is normally ineffectively energized, so that its front contacts are open and its back contacts closed. Battery 7 is then connected across the rails of section 3—4 through a path which passes from the upper terminal of this battery, through back point of contact 8, relay winding 5, to track rail 1, and from track rail 1ª, through a current-limiting resistance 10 and the back point of contact 9, to battery 7. The current which flows in this path through winding 5 when track section 3—4 is unoccupied, is insufficient to effectively energize relay X, but when a car or train enters this section, the increased current flowing in winding 5 due to the shunting action of the wheels and axles is sufficient to effectively energize relay X, thereby opening the back contacts and closing the front contacts of this relay. Battery 7 then becomes connected across the track rails in the opposite direction, through a path which passes from the upper terminal of battery 7, through the front point of contact 8, winding 6, and resistance 10, to rail 1ª, and from rail 1, through the front point of contact 9 to the battery 7. The current which then flows through winding 6 is of sufficient value to keep relay X energized until the car or train leaves section 3—4. Windings 5 and 6 are so connected in these circuits that the magnetic flux created by winding 5 when the back contacts are closed is in the same direction as the flux created by winding 6 when the front contacts are closed.

Located at the other end of the section 3—4 is a polarized relay R, having an operating winding 11, a neutral contact 12, and a polar contact 13. Winding 11 is connected across the rails 1 and 1ª. This relay R controls the proceed lamp G of a signal for section 3—4, the circuit being from terminal B of a suitable source of current, through polar contact 13, neutral contact 12, and the lamp G to terminal O of the same source of current. Polar contact 13 is closed when and only when battery 7 is connected across the rails in the direction corresponding to the unoccupied condition of section 3—4. Signal S will usually comprise other lamps for giving caution and stop indications, but the control of these lamps forms no part of my present invention.

When section 3—4 is unoccupied, the back contacts 8 and 9 of relay X are closed, so that lamp G is lighted to give a proceed indication. When a car or train enters section 3—4, it will ordinarily shunt enough current from winding 11 of relay R to cause neutral contact 12 of this relay to open, thereby opening the circuit for signal lamp G. At the same time the car or train will cause enough increase in the current from battery 7 flowing through winding 5 to open the back contacts 8 and 9 of relay X and close the front contacts of this relay, thereby reversing the polarity of the current supplied to the rails 1 and 1ª. If enough of this current of reverse polarity reaches relay R it will cause contact 13 to reverse, thereby opening the signal circuit at that point, and if neutral contact 12 is not opened due to the shunting action of the car or train, this contact will now open due to the reversal of the polarity of the current supplied to winding 11. It will thus be seen that a track circuit embodying my invention provides increased assurance that lamp G of signal S will be extinguished in response to the entrance of the car or train into the section controlled by this signal.

When the car or train leaves section 3—4, the current flowing through winding 6 of relay X will be decreased to such value that the front contacts of this relay will be opened and the back contacts will be closed, thereby restoring the apparatus to the condition in which it is shown in the drawing.

Although I have herein shown and described only one form of track circuit embodying my invention, it is understood that various changes and modifications may be made therein within the scope of the appended claims without departing from the spirit and scope of my invention.

Having thus described my invention, what I claim is:

1. In combination, a section of railway track, a source of track circuit current, a relay having two operating windings, means operating when the back contacts of said relay are closed to connect said source across the rails of said section in one direction through one winding of the relay, the parts being so proportioned that the relay is then not effectively energized while the section is unoccupied but becomes effectively energized when the section is occupied by a vehicle, means operating when the front contacts of said relay are closed to connect said source across the rails of said section in the other direction through the other relay winding, a polarized relay receiving current from the rails of said section, and a signal controlling circuit including a polar contact of said polarized relay closed only when said source is connected in the first mentioned direction.

2. In combination, a section of railway track, a source of track circuit current, means for connecting said source across the rails of said section in one direction or the other according as the section is unoccupied or occupied, a polarized relay receiving current from the rails of said section, and a signal controlling circuit including a polar contact of said polarized relay closed only when said source is connected in the first mentioned direction.

3. In combination, a section of railway track, a source of track circuit current, a pole-changer for reversibly connecting said source across the rails of said section, means responsive to the presence and absence of trains in said section for operating said pole-changer, and a polarized relay receiving current from the rails of said section.

4. In combination, a section of railway track, a source of track circuit current, a pole-changer for reversibly connecting said source across the rails of said section, means responsive to the presence and absence of trains in said section for operating said pole-changer, a polarized relay receiving current from the rails of said section, and a signal controlling circuit including a polar contact of said relay closed only when said source is connected in the direction corresponding to the unoccupied condition of said section.

5. In combination, a section of railway track, a source of track circuit current, a pole-changer for reversibly connecting said source across the rails of said section, means responsive to traffic conditions in said section for operating said pole-changer, and a polarized relay receiving current from the rails of said section.

6. In combination, a section of railway track, a source of track circuit current, a pole-changer for reversibly connecting said source across the rails of said section, means responsive to traffic conditions in said section for operating said pole-changer, a polarized relay receiving current from the rails of said section, and signaling means controlled jointly by a neutral and a polar contact of said relay.

7. In combination, a section of railway track, a source of track circuit current connected across the rails of said section, a relay interposed in said connection and arranged to be normally ineffectively energized but to become effectively energized when the section is occupied by a vehicle, means including contacts of said relay for reversing the connection of said source across the rails, and a polarized relay receiving current from the rails of said section.

8. In combination, a section of railway track, a track relay for said section, and means governed by traffic conditions for supplying track circuit current of one or the other relative polarity to said section according as said section is occupied or unoccupied respectively.

9. In combination, a section of railway track, a track relay for said section, means for normally supplying track current of a given relative polarity to said section, and means governed by traffic conditions for reversing said polarity when said section becomes occupied and for restoring said given polarity when and only when said section becomes unoccupied.

10. In combination, a section of railway track, a relay having two operating windings, means operating when said relay is not effectively energized for supplying current of one relative polarity to said section and to one of said windings, the parts being so proportioned that the relay is not effectively energized while the section is unoccupied but becomes effectively energized when the section is occupied by a vehicle, means operating when said relay is effectively energized for supplying current of the other relative polarity to said section and to the other of said windings in such direction that said relay will remain in its effectively energized condition until said vehicle leaves the section, a track relay for said section, and signaling apparatus governed by said track relay.

11. In combination, a section of railway track, a circuit for supplying current of one or the other relative polarity to said section according as said section is occupied or unoccupied respectively, a polarized track relay for said section having a polar contact which is closed when and only when said section is supplied with current of the polarity corresponding to the unoccupied condition of said section, and a signal controlling circuit including said polar contact.

12. In combination, a section of railway track, means including a pole-changer associated with said section and governed by traffic conditions in the section in such manner as to supply current of one or the other relative polarity to said section according as the section is occupied or unoccupied respectively, a polarized track relay for said section, having a normally closed polar contact, and signaling apparatus controlled over said polar contact.

JAMES H. BUTRIDGE.